April 4, 1967     O. E. MITCHELL     3,312,886
INDUCTION BRAKE SPEED CONTROL FOR ELEVATORS
Filed June 11, 1963     4 Sheets-Sheet 1
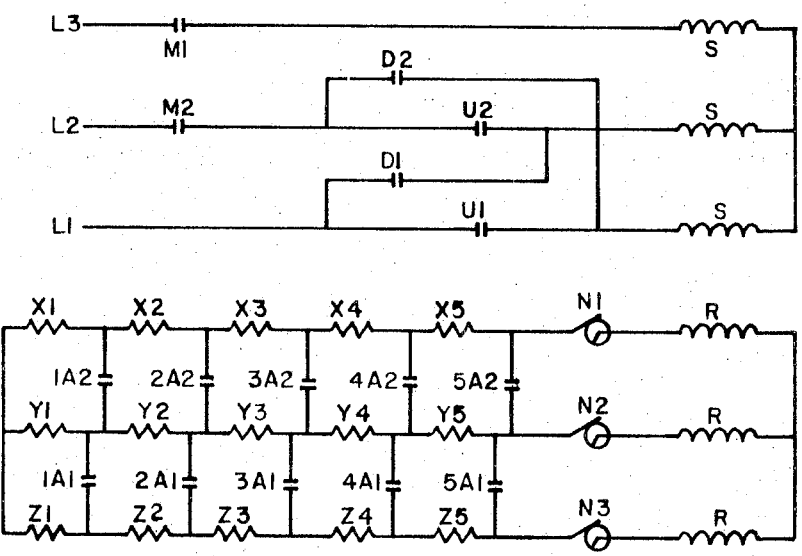
FIG·2
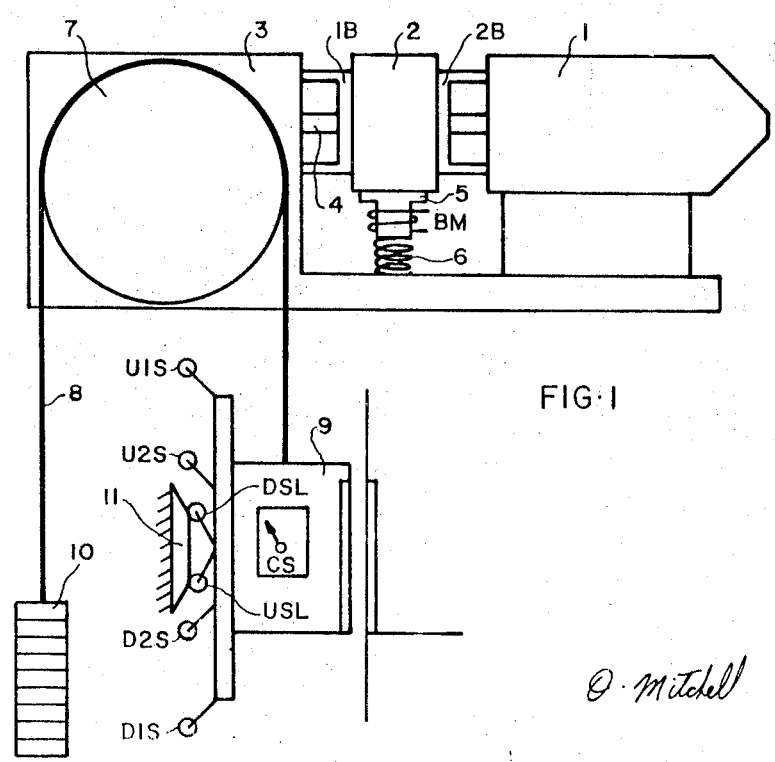
FIG·1

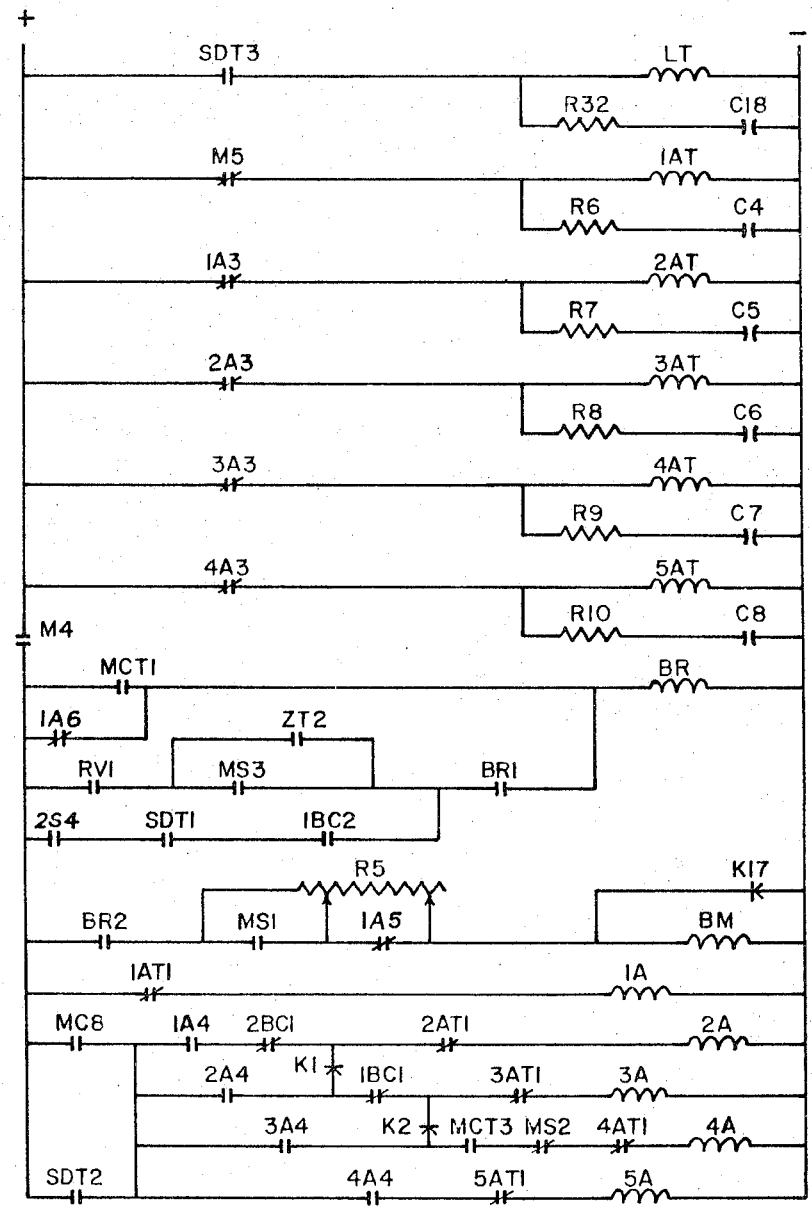
FIG·4

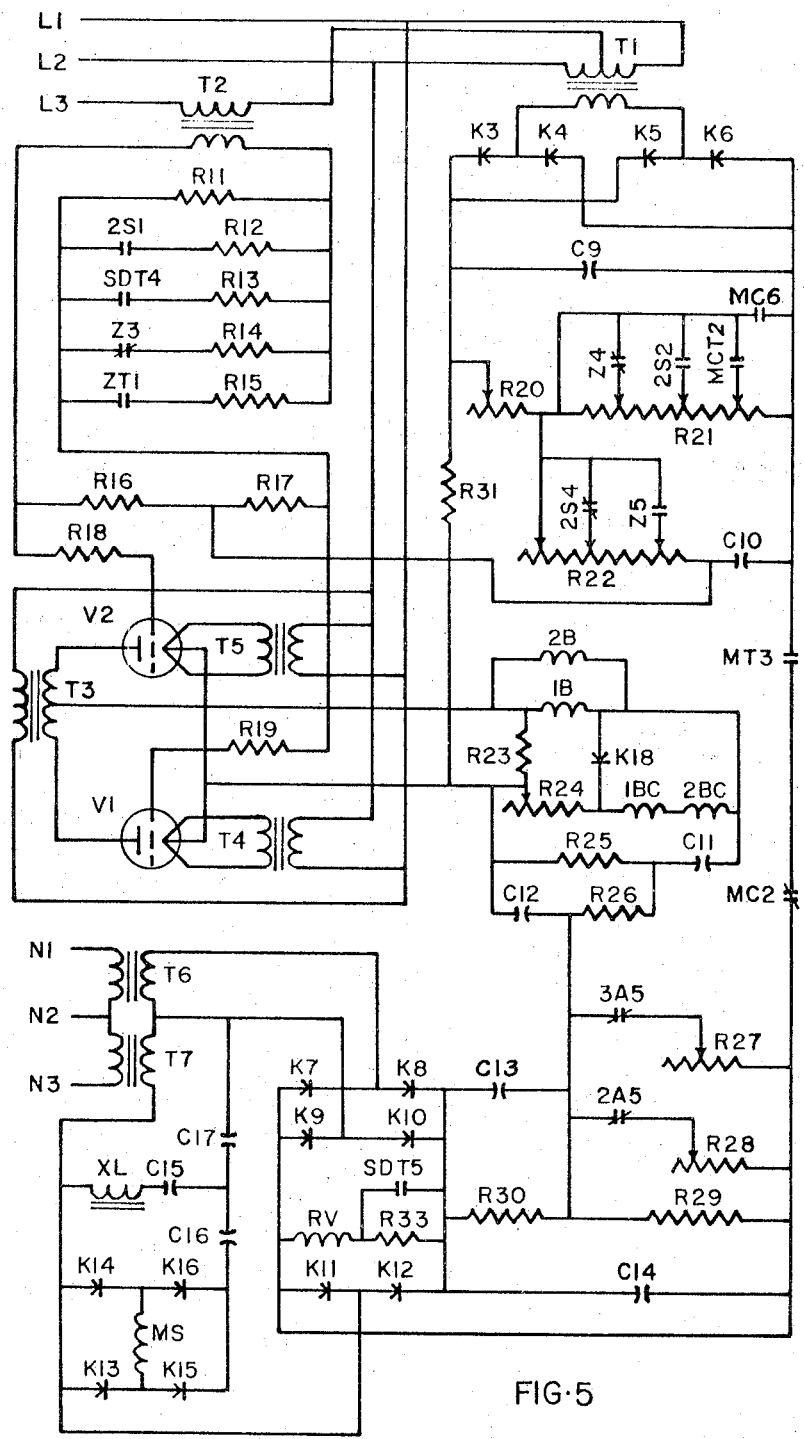
FIG·5

United States Patent Office 3,312,886
Patented Apr. 4, 1967

3,312,886
INDUCTION BRAKE SPEED CONTROL
FOR ELEVATORS
Omery Edward Mitchell, Toronto, Ontario, Canada, assignor to Turnbull Elevator Limited, Toronto, Ontario, Canada, a corporation of Canada
Filed June 11, 1963, Ser. No. 287,081
10 Claims. (Cl. 318—204)

In order to obtain a reasonably high running speed and also good stopping accuracy, many elevators and hoists are decelerated to a slower landing speed before stopping at a floor. Most conventional systems employ either a two-speed alternating-current motor or a direct-current motor supplied by a field-controlled generator. In the case of a two-speed motor, the ratio of running speed to landing speed is usually limited to 4:1 for economic reasons, while the direct-current motor system is inherently expensive.

This invention relates to a speed control system employing a wound-rotor motor which operates in conjunction with an induction brake to decelerate the moving apparatus to a landing speed which may be approximately 1:15 of running speed.

During slowdown, the induction brake magnet coil is supplied from an amplifier which is controlled principally by the difference between a voltage representing the desired speed, hereinafter referred to as the pattern voltage, and a voltage representing the actual speed, hereinafter referred to as the sample voltage. Also during slowdown, the motor torque is controlled by adjustment of rotor-circuit resistance according to the amplitude of induction brake magnet current.

Final stopping is obtained by a conventional spring-applied magnet-released friction brake. In the case of overhauling loads, additional stopping torque is provided by the induction brake.

Acceleration is accomplished in the conventional manner, by progressively reducing the rotor circuit resistance.

Other features of the invention will be apparent from the following description of the drawings, which describe a relatively simple system to illustrate the invention.

FIG. 1 is a mechanical diagram of a conventional elevator system, including parts relevant to the invention.

FIG. 2 is the power circuit of the motor.

FIG. 3 and FIG. 4 are relay circuit diagrams.

FIG. 5 is the speed control circuit diagram.

Figure 3:
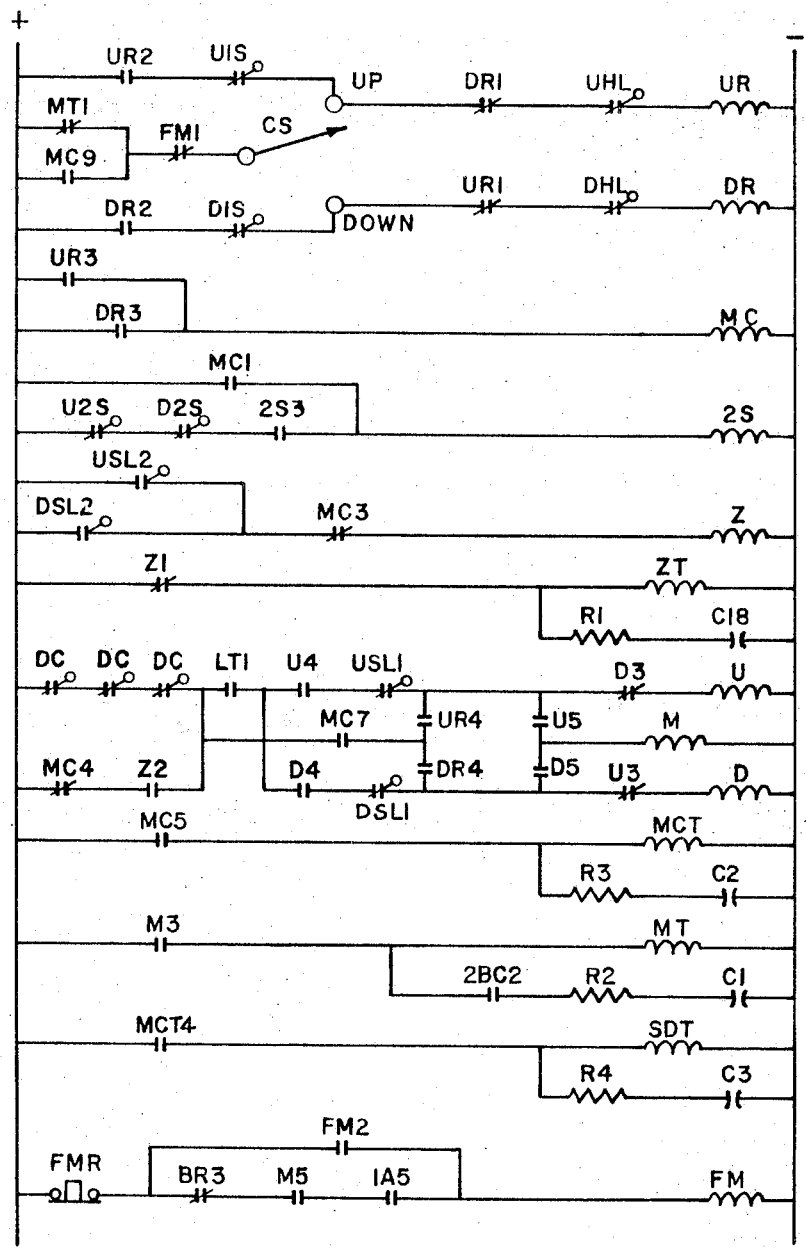

In the drawings, relay contacts are designated by the same letters as the magnet coil which operates them: for example, contacts UR1 and UR2 are respectively opened and closed by energization of "up run" relay coil UR. Mechanically operated contacts are distinguished by a lever which operates them: for example, contacts USL1 and USL2 are respectively opened and closed when cam 11 depresses switch lever USL.

Referring to FIG. 1, a three-phase wound-rotor induction motor 1 drives a brake pulley 2 and speed-reduction gear box 3 through a shaft 4. A brake shoe 5 is forced against pulley 2 by a compression spring 6. The brake shoe can be retracted from contact with the pulley by energization of a brake magnet BM. A cable sheave 7 on the ouptut shaft of gear box 3 supports a hoist cable 8. Suspended from cable 8 is a car 9 and a counterweight 10.

An operating car switch CS is mounted in the car, and up slowdown switches U1S, U2S, down slowdown switches D1S, D2S, and up and down stopping switches USL and DSL respectively are mounted on the car so as to be actuated by cam 11. A similar cam is provided at each floor level.

Induction brake magnets 1B and 2B are shown mounted from the gear box and motor frame respectively, and extending axially inside the rim of pulley 2, but with radial clearance from the rim. This constitutes a double induction brake.

In FIG. 2 the motor stator windings S are energized from the three-phase power lines L1, L2, L3 by the closing of contacts M1, M2 and either contacts U1, U2 for up direction or D1, D2 for down direction. The rotor windings R are connected through slip rings N1, N2, N3 to external resistors X, Y, Z. The energizing of relay 1A closes contacts 1A1, 1A2 to short out resistors X1, Y1, Z1. The closing of contacts 2A1 and 2A2 of relay 2A shorts out resistors X2, Y2, Z2, etc., to accelerate the motor. Finally the closing of contacts 5A1 and 5A2 of relay 5A short-circuits the slip rings N1, N2, N3 for full speed running of the motor.

In FIG. 3, a source of direct voltage designated + and − is provided. Assume that it is desired to travel in the up direction. The manual lever of car switch CS must be moved to the up contact, thus energizing relay coil UR through relay contacts MT1, FM1, DR1 and high-speed limit switch UHL. This switch UHL is mounted in the hoistway near the top floor, so that the car will slow down for the terminal floor even though the car switch CS is held in the up direction.

The closing of contact UR3 energizes relay MC. Each elevator door causes a door contact DC to close when the door is closed. Provided that all elevator doors have been closed, relay coil U will be energized through door contacts DC and relay contacts MC7, UR4 and D3. Relay coil M is then energized through contact U5. As described under FIG. 2, the motor stator is now energized for up travel. Relay coils 2S and MCT are energized through contacts MC1 and MC5 respectively. Relay coil MT is energized through contact M3. Relay coil SDT is energized through contact MCT4.

In FIG. 4, relay coil BR is energized through contacts M4 and MCT1. Relay coil LT is energized through contact SDT3. Brake magnet coil BM is now energized through contacts M4, BR2, MS1 and 1A5, to lift the brake shoe 5 against compression spring 6 and allow the motor to start. The opening of contact M5 allows capacitor C4 to begin discharging through resistor R6 into relay coil 1AT. After a short time, relay coil 1AT is sufficiently deenergized to allow contact 1AT1 to close, thus energizing relay coil 1A. The consequent opening of contact 1A3 causes relay 2AT to time out, so that relay coil 2A is energized through contacts MC8, 1A4, 2BC1 and 2AT1. The opening of contact 2A3 allows relay 3AT to time out and relay coil 3A is energized through contacts MC8, 2A4, 1BC1 and 3AT1. The opening of contact 3A3 times out relay coil 4AT, so that relay coil 4A is energized through contacts MC8, 3A4, MCT3, MS2 and 4AT1. The opening of contact 4A3 times out relay 5AT. Relay coil 5A is then energized through contacts MC8, 4A4 and 5AT1. This results in the acceleration of the motor to full speed, as described under FIG. 2.

FIG. 5 is a diagram of the speed control for the induction brakes. Supply lines L1 and L2 feed the primary winding of transformer T1. The output of the secondary winding is full-wave rectified by rectifiers K3, K4, K5 and K6, and is then smoothed by capacitor C9 and applied to a voltage divider consisting of a series array of resistors R20 and R21. The output voltage across resistor R21 is then applied to a series array of resistor R22 and capacitor C10. The voltage across capacitor C10 is the pattern voltage, as previously defined.

Motor slip-ring terminals N1, N2 and N3 feed the primary windings of an open-delta array of transformers T6 and T7. The output of the secondary windings is 3-phase full-wave rectified by rectifiers K7, K8, K9, K10, K11 and K12, and then smoothed by capacitor C14. The voltage from capacitor C14 is applied to a voltage divider consisting of a series array of resistors R30 and R29. Resistor R29 is parallelled by resistors R28 and R27 through normally-closed contacts 2A5 and 3A5 respectively. The voltage across resistor R29 is the sample voltage, as previously defined. The negative terminals of capacitor C10 and resistor R29 are connected through relay contacts MC2 and MT3 during slowdown, so that the voltage between positive terminals of capacitor C10 and resistor R29 is the difference between the pattern voltage and the sample voltage.

Supply lines L1 and L2 feed the primary windings of transformers T3, T4 and T5. The secondary windings of transformers T4 and T5 supply the heaters of thyratrons V1 and V2 respectively, and the secondary winding of transformer T3 supplies the anode voltage. From the heater cathodes of tubes V1 and V2, the thyratron current passes through a series resistor R24, a series array of the low-resistance relay coils 1BC and 2BC, a parallel array of the induction brake magnet coils 1B and 2B, and returns to the centre tap of the secondary winding of transformer T3.

Connected across resistor R24 and relay coils 1BC and 2BC is a series array of resistor R25 and capacitor C11, which constitutes a derivative network, that is, the voltage across resistor R25 is substantially proportionate to the rate of change of the voltage across resistor R24. Connected across resistor R25 is a series array of capacitor C12 and resistor R26. This is a filter circuit of relatively short time constant, so that the voltage across capacitor C12 is substantially proportionate to the rate of change of current through the induction brake magnets. This voltage will be referred to hereinafter as the derivative voltage. Capacitor C12 is connected between the thyratron heater cathodes and the positive terminal of resistor R29.

The primary winding of transformer T2 is connected between supply line L3 and the centre tap of the primary winding of transformer T1. Thus the secondary voltage of transformer T2 is 90° out of phase with the secondary voltage of transformer T3 which feeds the thyratron anodes. A series array of two equal resistors R16 and R17 of relatively low resistance, and resistor R11 of relatively high resistance, is connected across the secondary winding of transformer T2. Resistors R12, R13, R14 and R15 are connected in parallel with resistor R11 through contacts 2S1, SDT4, Z3 and ZT1 respectively. The common point of resistors R16 and R17 is connected to the positive terminal of capacitor C10, and the other ends of resistors R16 and R17 are connected to the control grids of the thyratrons V2 and V1 through current-limiting grid resistors R18 and R19 respectively. The voltages across resistors R16 and R17 will be referred to hereinafter as the rider voltages.

It is now apparent that, during slowdown, the derivative voltage, the sample voltage, the pattern voltage and a rider voltage are connected in series from cathode to grid of each thyratron.

A detailed slowdown sequence will now be described. Assume that the car is running up at full speed, as previously stated. The lever of car switch CS is returned to neutral position before the up slowdown switch U1S has contacted the cam representing the floor level at which it is desired to stop. When cam 11 opens switch U1S, relay UR drops out. The opening of contact UR3 drops out relay MC. The opening of contact MC5 causes relays MCT to start timing out. The opening of contact MC8 drops out relays 2A, 3A, 4A and 5A, which introduces sufficient resistance into the rotor circuit to reduce the motor torque to a negligible value. The closing of contact MC2 completes the series connection of derivative, sample, pattern and rider voltages to control the thyratrons. The opening of contact MC6 increases the voltage across resistor R21, causing a charging current into capacitor C10 so that the pattern voltage begins to increase at a rate determined by resistor R22.

The sample voltage remains approximately zero while the motor is near synchronous speed, since the slip-ring voltage is zero at synchronous speed. As the pattern voltage increases, the grids of the thyratrons become positive with respect to the cathodes earlier in the positive half cycle of applied anode voltage, so that the thyratron current through resistor R24, relay coils 1BC and 2BC, and induction brake coils 1B and 2B begins to increase rapidly. Since relay coil 1BC has approximately twice as many turns as coil 2BC, relay 1BC picks up almost immediately. The motor begins to decelerate because of the energization of the induction brake. The rapidly increasing thyratron current through resistor R24 and relay coils 1BC and 2BC produces a proportionate voltage applied to the series array of resistor R25 and capacitor C11. The resulting high charging current into capacitor C11 produces a relatively large voltage drop across resistor R25. The same voltage, somewhat smoothed, will appear across capacitor C12. The voltage across capacitor C12 tends to make the grid negative with respect to cathode, which limits the rate of increase of induction brake magnet current, and thus limits the rate of increase of induction brake torque, to avoid a hard decelerating bump on the car.

When relay MCT times out, the opening of contact MCT4 starts relay SDT timing out. Also, the opening of contact MCT2 causes an increase in voltage across resistor R21, so that the pattern voltage across capacitor C10 continues to increase.

As the motor decelerates, the slip-ring voltage increases almost linearly, so that the sample voltage across resistor R29 increases. If the pattern voltage and sample voltage increase equally, the thyratron current will level off to a steady value. If the pattern voltage increases faster than the sample voltage, the grids will become more positive with respect to cathodes so that the current into the induction brake magnets increases to produce more decelerating torque. This would be the case with an overhauling load, such as lowering a full-loaded car. If the sample voltage increases faster than the pattern voltage, the thyratron current and hence induction brake magnet torque will decrease. This would be the case when hoisting a heavy load.

When the car reaches a point of travel where slowdown switch U2S is opened by cam 11, relay 2S drops out. The opening of contact 2S2 increases the voltage drop across resistor R21, so that the pattern voltage across capacitor C10 continues to increase. The closing of contact 2S4 shorts out part of resistor R22, so that the charging rate of capacitor C10 is increased. Also, the opening of contact 2S1 disconnects resistor R12 from parallel array with resistor R11, thus increasing the voltage drop across resistor R11 and decreasing the amplitude of the rider voltages across resistors R16 and R17.

Assume that relay SDT has now timed out. Sufficient induction brake magnet current still flows to maintain contact 1BC1 open. With hauling loads, relay coil 2BC will be so weakly energized that contact 2BC1 will be closed. Relay 2A will now be energized through contacts SDT2, 1A4, 2BC1, and 2AT1. The closing of contacts 2A1 and 2A2 in the rotor circuit increases the motor torque, which may be required to land hauling loads. When contact 2A3 opens, relay 3AT begins to time out. With medium hauling loads, the speed regulator will maintain sufficient induction brake current that contact 1BC1 remains open. With heavy hauling loads, the induction brake current will approach zero, and relay coil 3A will be energized through contacts SDT2, 2A4, 1BC1 and 3AT1. The motor torque again increases because of the closing of contacts 3A1 and 3A2 in the rotor circuit. Relay 4A will not pick up when contact 4AT1 closes because of the open contact MCT3. With overhauling loads, the induction brake current will be sufficient to open contact 2BC1 early in the slowdown and maintain it open until the car stops. In this case, accelerator relays 2A and 3A remain dropped out after contact SDT2 closes. This is desirable since increased motor torque would result in unnecessary induction brake heating. When either relay 2A or 3A picks up during slowdown, the resulting increased motor torque tends to accelerate the motor, which lessens the sample voltage relative to the pattern voltage, makes the thyratron grid more positive with respect to cathode and so increases the induction brake current. The current increase might be sufficient to open contact 1BC1 or 2BC1, causing relay 3A or 2A respectively to drop out again, resulting in an oscillation between the induction brake magnet current and the controlled accelerator relays 2A and 3A. This can be prevented by the use of rectifiers K1 and K2, which seal in relays 2A and 3A through contacts 2A4 and 3A4 respectively.

When contact SDT4 opens, resistor R13 is disconnected from parallel array with resistor R11, resulting in a further decrease in amplitude of the rider voltages across resistors R16 and R17.

When the car reaches the point of travel where switch DSL contacts cam 11, contact DSL1 opens and contact DSL2 closes. Relay coil Z is energized through contacts DSL2 and MC3. The opening of contact Z1 starts relay ZT timing out. The doors may now be opened manually, since the door contacts DC are paralleled by a series array of contacts MC4 and Z2. The opening of contact Z3 disconnects resistor R14 from parallel array with resistor R11, thus lessening the amplitude of the rider voltages across resistors R16 and R17. The opening of contact Z4 increases the voltages drop across resistor R21, so that the pattern voltage across capacitor C10 continues to rise. The closing of contact Z5 increases the charging rate of capacitor C10 so that the pattern voltage quickly reaches a steady state landing speed value. When relay ZT times out, the opening of contact ZT1 disconnects resistor R15 from parallel array with resistor R11, so that the amplitude of the rider voltages across resistors R16 and R17 is very small. The large amplitude of rider voltages early in the slowdown results in reduced sensitivity of the thyratrons to grid voltage changes, and hence a smooth deceleration. The decrease in rider voltages as the car approaches floor level results in increased sensitivity to grid voltage changes, and hence accurate landing speed control.

When switch USL contacts cam 11, the opening of contact USL1 causes relays U and M to drop out, which disconnects supply lines L1, L2 and L3 from the stator windings S. The induced slip-ring voltage immediately becomes zero. The opening of contact M4 drops out relay BR and removes the supply voltage from the friction brake magnet BM. The discharge current of the brake magnet decays through rectifier K17, allowing compression spring 6 to gradually apply the friction brake shoe 5 to brake pulley 2 to bring the motor to a stop.

If, due to an overhauling load, sufficient induction brake magnet current has been flowing to hold up relay 2BC during landing, relay MT will not drop out when contact M3 opens, but will time out because capacitor C1 discharges through resistor R2, contact 2BC2 and relay coil MT. The induction brake remains energized until contact MT3 opens, and since the sample voltage derived from the slip ring is zero after relay M drops out, the thyratrons are turned full on while relay MT is timing out. This produces maximum induction brake magnet current until after the friction brake has stopped the car, for overhauling loads.

For other than overhauling loads, contact 2BC2 is open when contact M3 opens, so that relay MT drops out immediately after relay M to deenergize the induction brake magnet. The induction brake can be always energized during the final stop by shorting out contact 2BC2, or always deenergized by permanently opening contact 2BC2, but this is the preferred method of operation.

The opening of contact MT3 breaks the series connection of sample voltage and pattern voltage. A resistor R31 connects the thyratron cathodes to the positive end of resistor R20. Thus, from cathode to grid, a series connection of resistors R31, R20, R22, R16 and R18 or R17 and R19 exists at all times except during slowdown. The voltage drop across resistor R20 maintains a negative grid bias to prevent tube conduction during this time. The resistance of R31 is sufficiently large that it produces negligible distortion of the speed regulation circuit during slowdown.

Operation during up travel of the car has been described. The description of down travel is identical except that the functions of relays UR and DR, U and D, and switches U1S and D1S, U2S and D2S, USL and DSL, UHL and DHL are interchanged.

After relay SDT times out during slowdown, accelerator relays 2A and 3A may or may not be energized, according to the amplitude of induction brake current as previously described. If, for example, relay 2A is energized, the closing of contacts 2A1 and 2A2 immediately lowers the slip-ring voltage because of the reduction in external resistance of the rotor circuit. Since the sample voltage is derived from the amplitude of the slip-ring voltage, a compensation for this reduction in slip-ring voltage is required, so that the sample voltage is not affected by the energizing of relay 2A or 3A. When neither relay 2A nor 3A is energized, resistors R27 and R28 are connected in parallel with resistor R29 through contacts 3A5 and 2A5 respectively. When relay 2A is energized, the consequent reduction in slip-ring voltage, which results in a reduction of the voltage across resistors R30 and R29, is compensated for by the disconnecting of resistor R28, so that the voltage across resistor R29 remains unchanged. If relay 3A is also energized, the consequent further reduction in voltage across resistors R30 and R29 is compensated for by the disconnecting of resistor R27, so that the voltage across resistor R29 is again unchanged.

Resistors R27 and R28 may be adjusted to maintain constant voltage across resistor R29 with the rotor at stand-still and relays 2A and 3A operated manually, for convenience. To do this, contacts BR2 and MCT3 must be removed to prevent the energizing of the friction brake magnet and the connecting of excessively low external rotor resistance, respectively, before energizing the stator.

A capacitor C13 is connected in parallel with resistor R30 in the sample voltage circuit. This produces a distortion in the sample voltage across resistor R29, so that it contains a component of voltage proportionate to the rate of change of slip-ring voltage, and hence proportionate to the rate of deceleration of the elevator. A rapid deceleration results in a transient excessive sample voltage which tends to turn off the thyratrons and ease the rate of deceleration.

Capacitor C13 is also effective in minimizing the tendency to accelerate if relay 2A or 3A picks up during slowdown. When contacts 2A1 and 2A2 close to reduce the amount of external resistance connected to the slip rings, the slip-ring voltage and hence the direct voltage across the series array of resistors R29 and R30 is almost instantaneously reduced. By means of capacitor C13, the sample voltage across resistor R29 is transiently reduced by the same amount. This tends to turn on the thyratrons transiently to increase the induction brake torque and opposite the tendency of the increased motor torque to accelerate the machine.

A further suppression of this acceleration tendency can be obtained if required by connectnig capacitors in parallel with contacts 2A5 and 3A5, to produce an additional transient unbalance of the voltage divider consisting of resistors R29 and R30.

Since the deceleration of the elevator depends on the closing of contacts and the operating of electronic tubes, it is necessary to provide failure detecting means which will cause the friction brake to be applied in case of failure of the slowdown speed control. After the operation of a failure detector, it may be desirable that the car be prevented from further operation until manually reset, to prevent inaccurate landings and undue friction brake wear in case of repeated failure of the induction brake to operate properly.

When relay MC drops out to begin the slowdown, the closing of contact MC2 completes the control circuit to the thyratron grids, and the opening of contact MC5 starts relay MCT timing out. Thyratron current should begin to flow immediately, and should quickly reach a value sufficient to close contact 1BC2 in the circuit of relay coil BR. If contact 1BC2 fails to close before contact MCT1 opens, relay BR drops out, and the opening of contact BR2 deenergizes the friction brake magnet BM to apply the friction brake and stop the car.

Assuming that contact 1BC2 closes before contact MCT1 opens and the elevator continues to decelerate in a normal manner, the slip-ring voltage will rise. This voltage is full wave rectified, and connected to relay coil RV through contact SDT4. Relay SDT is timing out as a consequence of the opening of contact MCT4 near the beginning of slowdown. When the motor has decelerated to approximately half speed, the rotor voltage will have risen sufficiently to pick up relay RV and close contact RV1 in the circuit of relay coil BR. If contact SDT1 or contact 2S4 opens before contact RV1 closes, relay BR will drop out to deenergize friction brake magnet coil BM and apply the friction brake. Assume that the motor decelerates normally so that relay RV picks up and relays SDT and 2S drop out shortly after. The opening of contact SDT5 inserts resistor R33 in series with relay coil RV. Resistance R33 is such that any reduction in rotor voltage will cause relay RV to drop out. If for any reason, such as thyratron failure, the car should begin to accelerate after relay SDT drops out, the resulting decrease in rotor voltage will cause relay RV to drop out. The opening of contact RV1 would drop out relay BR to apply the friction brake.

Connected to the secondary winding of the transformer T7 is a high-pass frequency filter consisting of two series capacitors C16 and C17 and a shunt branch comprising a series array of capacitor C15 and inductor XL. The output of this filter is connected to relay coil MS through full-wave rectification K13, K14, K15 and K16. As the motor decelerates, the rotor voltage increases in frequency to reach line frequency, say 60 cycles per second, at standstill. At landing speed, the rotor frequency may be approximately 56 c.p.s. The frequency filter may be designed ot pass all frequencies above 50 c.p.s. Therefore relay MS will pick up when the motor has decelerated to 1:6 of synchronous speed.

Assume that the car is decelerating normally. When switch DSL contacts cam 11, the closing of contact DSL2 energizes relay coil Z through contact MC3. The opening of contact Z1 starts relay ZT timing out. When the car has declerated to 1:6 of full speed., relay MS picks up to close contact MS3 in the circuit of relay coil BR. If contact ZT2 opens before contact MS3 closes, relay BR drops out to apply the friction brake. This is desirable because the elevator doors may be opened after contact Z2 closes without stopping the car, which could be dangerous unless the car is proved to be at a slow speed.

It is now apparent that three checks are made during each slowdown; to prove that at least a predetermined amount of current flows into the induction brake within a given time after slowdown has begun, to prove that the rotor voltage has risen to a predetermined amplitude within a given time or distance after the beginning of slowdown, and to prove that the frequency of the rotor voltage has risen to at least a pre-determined frequency within a given time after the car has reached a given position before floor level.

If any one of these checks is not proved satisfactorily, relay BR immediately drops out to apply the friction brake. Relay coil FM is immediately energized through a push-button FMR and relay contacts BR3, M5 and 1A5. The closing of contact FM2 seals in relay coil FM, so that relay FM constitutes a failure memory.

The application of the friction brake may stall the car short of the floor, so that relays U and M maintain power on the motor stator. When relay SDT times out due to the opening of contact MCT4 the opening of contact SDT3 permits capacitor C18 to discharge through resistor R32 into relay coil LT. After a few seconds, contact LT1 opens to drop out relays U and M which deenergize the motor. It is necessary to press reset button FMR to drop out relay FM, thus closing contact FM1 in series with car switch CS, in order that the car can be restarted after an operation of relay FM.

When the motor starts, relay MS picks up immediately since the rotor voltage starts at line frequency. Relay MS will drop out when the motor reaches approximately 1:5 of full speed to close contact MS2 in series with relay coil 4A, thus providing a convenient means of preventing the picking up of accelerator relays 4A and 5A until the motor has reached 1:5 speed, and so avoiding the possibility of excessive motor inrush current when accelerating heavy hauling loads.

When the motor is energized, full voltage is applied to the friction brake magnet BM through contacts M4, BR2, MS1 and 1A5, in order to lift the brake shoe 5 clear of pulley 2 as quickly as possible to allow the motor to start. When relay 1A picks up, the opening of contact 1A5 inserts part of resistor R5 in series with friction brake magnet BM to reduce the brake magnet current. When the motor has reached 1:5 of full speed, relay MS drops out. Contact MS1 opens to insert an additional part of resistor R5 in order to reduce the friction brake magnet current to a value just sufficient to hold brake shoe 5 retracted from contact with pulley 2. Thus, if contact BR2 opens during slowdown due to the operation of a failure detector, the friction brake is quickly applied to stop the car. As the car approaches landing speed, contact MS1 closes to short out part of resistor R5 and increase the brake magnet current. As the car approaches floor level the dropping out of relay M deenergizes the motor and the car decelerates, due to gravity in the case of a hauling load, or induction brake torque in the case of overhauling load. A short time after the opening of contact M4, brake shoe 5 contacts pulley 2 to stop the car.

Rectifier K18 provides a discharge path for relay coils 1BC and 2BC to prevent buzzing of these relays, and also to prevent the inductive discharge voltage of these coils from entering the derivative circuit composed of resistor R25 and capacitor C11. Resistor R23 provides a path for the inductive discharge current of induction brake magnet coils 1B and 2B.

Accelerator relay 1A remains energized at all times during slowdown. Obviously the forward motor torque provided by accelerator relay 1A is not required when landing, for example, an overhauling load, but this circuitry permits a smooth start with a minimum of slowdown control contacts in series with the accelerator relay coils. It will be apparent that an additional relay coil 3BC of fewer turns than relay coil 2BC could be connected in series with coils 1BC and 2BC, and a normally closed contact of relay 3BC connected in series with relay coil 1A, to extend the motor torque control during slowdown. Provided that the induction brake is capable of decelerating the maximum overhauling load to landing speed while relay 1A is energized, this additional complication is not necessary.

Smoothest acceleration is obtained with a larger number of accelerators, of which all but approximately the last two close in rapid succession. In this case all the accelerator timing relays except relays 4AT and 5AT can be eliminated, since the inherent pickup time of the accelerator relays is sufficient, or can be made so by electrical or mechanical means. Also in this case, it is feasible to connect individual contacts of each current-sensing relay, for example, relay 2BC, in series with two or more sequential accelerator relays. In any case, each accelerator relay which is controlled during slowdown should have a corresponding compensating resistor such as resistors R27 and R28 in the sample voltage circuit.

Automatic relevelling may be obtained if desired by shorting out contacts U4 and D4. Relay BR is energized through contacts M4 and 1A6 at the beginning of a relevelling sequence, in order to energize friction brake magnet BM. After relay 1A picks up, relay BR remains energized through contacts RV1, MS3 and BR1. The induction brake controls relevelling speed in the same manner as during slowdown.

The opening of contact LT1 after a few seconds provides the conventional time limit on relevelling sequence.

A compact machine assembly is obtained by mounting the induction brake magnets 1B and 2B inside the brake pulley rim as shown in FIG. 1. It is necessary to provide approximately .025 inch thickness of copper lining inside the brake pulley rim, through which the induction brake magnet flux passes radially, as a low resistance path for induced current. The brake pulley is conventionally made of cast iron. The induction brake magnet may be of a conventional type employing a single coil of copper wire coaxial with pulley 2, and a magnetic structure of soft iron or steel of generally cylindrical shape, which is coaxial with and passes through the inside of the coil, and protrudes alternately from each side of the coil in a series of projections which extend radially and around the outside diameter of the coil to terminate in a cylindrical surface which is mechanical running clearance from the copper lining, thus constituting a series of alternate north and south magnetic poles. Non-magnetic cooling fins may be mounted radially on each side of the brake pulley web, to provide a centrifugal flow of air to remove heat from the copper induction cylinder. For lower elevator speed or capacity, one of the induction brake magnets will provide sufficient torque.

The induction brake speed control has been described in connection with a very rudimentary elevator system, in which the selection of direction of travel and stopping floor are controlled manually by car switch CS. It is also assumed that the hall and car doors are operated manually. It will be apparent to persons skilled in the elevator art that this speed control can be used in conjunction with many types of elevator control. For example, the switches shown operated by cam 11 in FIG. 1 may be operated magnetically, or may be located in the machine room and operated by a mechanism driven by a cable connected to car 9. Also the number of these switches can be varied according to the degree of smoothness of slowdown required.

The motor can be caused to run at a speed that may be any fraction of synchronous speed, by preventing the closing of several of the last accelerator relays, by maintaining a pattern voltage of a suitable value and by maintaining a speed control circuit to the thyratron grids. A slow speed is desirable for inspection of the elevator hoistway. A reduced speed is also desirable where there is insufficient distance between floors to reach synchronous speed. For example, by preventing the closing of contact MCT3, accelerator relays 4A and 5A remain deenergized. By preventing the opening of contact MC2, the speed control circuit to the thyratron grids is maintained. By preventing the closing of contacts MC6 and MCT2, a pattern voltage is maintained which results in a car speed of say half of synchronous speed. But this is not required on the average installation, since standard floor-to-floor heights permit adequate time to accelerate to synchronous speed, in view of the fact that the practical maximum car speed with induction brake speed control is approximately 300 feet per minute.

The approximate values of components are listed in FIG. 6. It will be apparent that these values may vary greatly according to the type of thyratron used, and the design of relay and induction brake magnet coils. The secondary voltages only of the transformers are stated, as the primary voltages will be determined by the supply line and the motor rotor voltage. A rough approximation to the amount of external rotor resistance in ohms required to land a maximum hauling load can be obtained by dividing the square of the rated rotor voltage by the motor horsepower and multiplying by .0008.

A magnetic particle brake may be used in place of an induction brake, with the ability to provide standstill holding torque, but requiring magnetic fluid seals.

TYPICAL COMPONENT VALUES

Resistors (ohms)

| | |
|---|---|
| R1–4—500 | R21—2K |
| R5—300 | R22—5K |
| R6–10—500 | R23—2K |
| R11—100K | R24—50 |
| R12—10K | R25—200 |
| R13—22K | R26—1K |
| R14—33K | R27—10K |
| R15—47K | R28—10K |
| R16—1K | R29—2K |
| R17—1K | R30—500 |
| R18—56K | R31—33K |
| R19—56K | R32—2K |
| R20—2K | R33—2.2K |

Capacitors (mfd.)

| | |
|---|---|
| C1—20 | C10—60 |
| C2—20 | C11—200 |
| C3—60 | C12—20 |
| C4—20 | C13—200 |
| C5—10 | C14—20 |
| C6—10 | C15—3 |
| C7—60 | C16—2 |
| C8—60 | C17—2 |
| C9—40 | C18—300 |

Transformer sec. (volts)

| | |
|---|---|
| T1—115 | T5—2.5 |
| T2—115 | T6—115 |
| T3—600 | T7—115 |
| T4—2.5 | |

Inductors (henrys)

XL—5

What I claim as my invention is:

1. An elevator comprising a car serving a plurality of floors; an alternating-current motor for driving the car and having rotor windings connected to slip-rings; a friction brake and a direct-current operated induction brake mechanically coupled to the drive motor, the induction brake having a brake magnet coil; an amplifier for supplying direct current to the brake magnet coil; a control system for the amplifier capable of increasing and reducing the direct current supplied by the amplifier to the brake magnet coil; current-sensing means in circuit with the brake magnet coil for sensing the current in said coil; external resistance across the slip-rings of the motor; and means for changing the external resistance and operated by the current-sensing means to decrease the external resistance as the control system decreases the brake magnet coil current, thus increasing the motor torque as the induction brake torque decreases.

2. An elevator as claimed in claim 1, wherein the means for changing the external resistance comprise a plurality of relays having contacts for changing the external resistance connections; and the current-sensing means comprise a plurality of relays having coils connected in series with the induction brake magnet coil and having contacts connected to operate the first mentioned relays in response to changes in the brake magnet coil current.

3. An elevator as claimed in claim 1, wherein the control system for the amplifier comprises means for providing an arbitrary pattern voltage representing the desired motor speed and means for providing a sample voltage opposed to said pattern voltage and representing the actual motor speed whereby said direct current supplied by the amplifier can be controlled to bring the motor speed to the desired speed.

4. An elevator as claimed in claim 3, wherein the means for providing the sample voltage comprise means connected across the slip-rings, and compensating means are provided to maintain the sample voltage at a substantially constant value for any constant motor speed despite changes in said external resistance caused by the current sensing means.

5. An elevator as claimed in claim 4, wherein the means for changing the external resistance comprise a plurality of relays having contacts for changing the external resistance connections, the means for providing the sample voltage comprise a voltage divider connected across the slip-rings, and the compensating means comprise additional contacts of said relays for varying the voltage divider.

6. An elevator as claimed in claim 3, wherein the amplifier is a controlled rectifier having an alternating voltage supply; and the control system for the amplifier further comprises means for deriving from said direct current a derivative voltage substantially proportionate to the rate of change of said direct current, means for providing an alternating rider voltage substantially 90 electrical degrees out of phase with the alternating voltage supply of the amplifier, and means for supplying said pattern voltage and sample voltage as D.C. voltages in series with the derivative voltage and the rider voltage to control the amplifier.

7. An elevator as claimed in claim 6, including means operable when the car is a predetermined distance from a stopping floor for changing the pattern voltage progressively to a constant value representing a desired landing speed of the car, and means for decreasing the rider voltage progressively in amplitude to a constant value as the car approaches the stopping floor.

8. An elevator as claimed in claim 7, including means for causing the friction brake to be applied if, within a predetermined interval after the car was at said predetermined distance, the current-sensing means fails to sense a predetermined amplitude of brake magnet coil current.

9. An elevator as claimed in claim 7, including means responsive to slip-ring voltage amplitude, and means for causing the friction brake to be applied if, within a predetermined interval after the car was at said predetermined distance, the slip-ring voltage amplitude fails to rise to at least a predetermined value.

10. An elevator as claimed in claim 7, including means responsive to slip-ring voltage frequency, and means for causing the friction brake to be applied if within a predetermined interval after the arrival of the car at a given distance from the stopping floor the slip-ring voltage frequency fails to rise to at least a predetermined frequency.

References Cited by the Examiner

UNITED STATES PATENTS

| | | | |
|---|---|---|---|
| 2,985,809 | 5/1961 | Cortelli | 318—204 X |
| 2,994,024 | 7/1961 | Mitchell | 318—204 |
| 3,029,372 | 4/1962 | Vogt | 318—204 |
| 3,039,036 | 6/1962 | Wendelburg et al. | 318—204 |

ORIS L. RADER, *Primary Examiner.*

G. Z. RUBINSON, *Assistant Examiner.*